United States Patent [19]

Mathieu

[11] Patent Number: 4,490,482
[45] Date of Patent: Dec. 25, 1984

[54] METHOD FOR PRODUCING A CATALYST FOR OXIDIZING CARBON MONOXIDE

[75] Inventor: Pierre Mathieu, Quebec, Canada

[73] Assignee: Her Majesty the Queen in right of Canada, Ottawa, Canada

[21] Appl. No.: 545,259

[22] Filed: Oct. 25, 1983

[30] Foreign Application Priority Data

Mar. 2, 1983 [CA] Canada .................................. 422709

[51] Int. Cl.$^3$ ............................................. B01J 23/62
[52] U.S. Cl. .................................... 502/339; 502/325; 502/344
[58] Field of Search ............... 502/325, 339, 344, 352; 423/618

[56] References Cited

U.S. PATENT DOCUMENTS 3,842,017 10/1974 Armistead et al. ................. 502/339
4,000,089 12/1976 Senda ................................. 502/339

FOREIGN PATENT DOCUMENTS 2028571 3/1980 United Kingdom .

*Primary Examiner*—W. J. Shine
*Attorney, Agent, or Firm*—Cushman, Darby & Cushman

[57] ABSTRACT

A catalyst for recombining oxygen and carbon monoxide in a sealed $CO_2$ laser includes a stannic oxide base and a coating of at least one metal selected from the group consisting of platinum, palladium, ruthenium, gold and rhodium. The stannic oxide base is produced by preparing a mixture of a stannous salt such as stannous chloride and stannic acid, adding a base to the mixture to produce a mixture of stannic and stannous hydroxide, and adding an oxidizing agent such as hydrogen peroxide to the hydroxide mixture to yield a precipitate of stannic oxide. The stannic oxide is mixed with a catalyst metal salt such as the chloride of one of the metals mentioned hereinbefore, and a reducing agent, e.g. formic acid is added to the oxide and salt mixture to produce the salt, whereby the catalyst metal is deposited on the stannic oxide.

8 Claims, No Drawings

METHOD FOR PRODUCING A CATALYST FOR OXIDIZING CARBON MONOXIDE

This invention relates to a method of producing a catalyst and in particular to a method of producing a catalyst for use in a carbon dioxide laser.

As disclosed, for example by U.K. patent application No. 2,028,571, published on Mar. 5, 1980, in the name of the Secretary of State for Defence, carbon dioxide gas lasers include a sealed envelope containing a gas mixture of, inter alia, carbon dioxide, electrodes, a reflecting mirror and a partially reflecting mirror. Electrical discharges in the gas causes partial dissociation of $CO_2$ into CO and $O_2$. The carbon monoxide and especially the oxygen result in a considerable reduction in the performance of the laser after several operations. Thus, it is necessary to recombine the carbon monoxide and the oxygen as they are produced using a catalyst housed in the sealed envelope.

Different types of catalysts have been used to affect the recombination of CO and $O_2$. Some of the catalysts are effective at high temperatures only and thus must be heated, which requires the use of considerable quantities of electrical or other power. Room temperature catalysts exist. However, the efficiency of such catalysts is too low. It has been shown that a catalyst with a stannic oxide base and platinum, palladium, ruthenium or gold can be effective. The known procedure for making the catalyst is lengthy and difficult, and its efficacy is quite low.

The object of the present invention is to provide a relatively simple method of producing a room temperature catalyst with a stannic oxide base and a coating of platinum, palladium, ruthenium, gold or rhodium.

Accordingly, the present invention relates to a method of producing a catalyst of the type including a stannic oxide base and a coating of at least one catalyst metal selected from the group consisting of platinum, palladium, ruthenium, gold and rhodium comprising the steps of:
  (a) preparing a mixture of a stannous salt and stannic acid;
  (b) adding a base to said mixture to produce a mixture of stannic and stannous hydroxide;
  (c) adding an oxidizing agent to said hydroxide mixture to yield a stannic oxide precipitate;
  (d) mixing said stannic oxide with a salt of at least one said catalyst metal; and
  (e) adding a reducing agent to the oxide and salt mixture to reduce the salt, whereby the catalyst metal is deposited on the stannic oxide.

The use of a catalyst of the type defined above extends the life of the sealed laser. The catalyst permits up to 1.5 million impulses of $CO_2$ laser without degradation or diminution of power because of dissociation of the gas. Thus, sealed $CO_2$ lasers are made portable, and upkeep and maintenance are reduced.

The invention will now be described in greater detail with reference to the following detailed example of a preferred embodiment of the invention.

EXAMPLE

An aqueous solution of stannic chloride is prepared using 100 ml of $SnCl_4$ in 800 ml of distilled water. While stirring, ammonium hydroxide is added to the solution until the pH reaches 4. Approximately 250 ml of $NH_4OH$ solution is required to precipitate a stannic hydroxide gel. Stannic acid is produced by adding 60 ml of a 35% aqueous solution of HCl and continuously boiling until all of the hydroxide is dissolved.

100 g of $SnCl_2.2H_2O$ is added to the stannic acid, the mixture thus produced is heated until the solution boils, and a mixture of stannic and stannous hydroxides is produced by slowly adding a 28% solution of $NH_4OH$ until the pH reaches approximately 7. Approximately 150 ml of the base is required. Boiling is continued for 3-5 minutes.

The mixture of stannic and stannous hydroxides is oxidized by the addition of 62.5 g of a 30% aqueous solution of hydrogen peroxide and stirring for 3-5 minutes. The resulting precipitate is filtered, washed with distilled water, dried at 100° C. and pulverized to yield approximately 205 g of active stannic oxide.

Activation of the stannic oxide for carbon monoxide oxidation is achieved by the addition of 100 g of the oxide and 3.5 g of platinum chloride ($PtCl_4$) to 400 ml of distilled water. 4 g of a 90% aqueous solution of formic acid (HCOOH) is then added, and the mixture is heated to the boiling point while stirring. After approximately 4 minutes of boiling the platinum chloride is reduced, and the platinum is deposited on the stannic oxide, which is filtered and rinsed thoroughly with distilled water. Other metals such as ruthenium, gold, palladium and rhodium are deposited using a similar method. The resulting metal coated stannic oxide is dried in an oven at approximately 170° C. The catalyst thus obtained is ready for use.

The embodiments of the invention in which an exclusive property or privilege is claimed are defined as follows:

1. A method of producing a catalyst of the type including a stannic oxide base and a coating of at least one catalyst metal selected from the group consisting of platinum, palladium, ruthenium, gold and rhodium, said method comprising the steps of:
  (a) preparing a mixture of a stannous salt and stannic acid;
  (b) adding a base to said mixture to produce a mixture of stannic and stannous hydroxide;
  (c) adding an oxidizing agent to said hydroxide mixture to yield a stannic oxide precipitate;
  (d) mixing said stannic oxide with an aqueous solution of a salt of at least one said catalyst metal;
  (e) adding a reducing agent to the oxide and salt mixture to reduce the salt, whereby the catalyst metal is deposited on the stannic oxide; and
  (f) drying the resulting metal coated stannic oxide.

2. A method according to claim 1, wherein said stannic acid is prepared by adding a base to a stannic salt to produce a stannic hydroxide gel, and reacting said gel with hydrochloric acid.

3. A method according to claim 2, wherein ammonium hydroxide is added to an aqueous solution of stannic chloride to precipitate a stannic hydroxide gel; an aqueous solution of hydrochloric acid is added to the gel; and the resulting mixture is boiled until all of the hydroxide is dissolved.

4. A method according to claim 1, wherein said stannous salt is stannous chloride and said catalyst metal salt is a chloride of the catalyst metal.

5. A method according to claim 4, wherein said base is ammonium hydroxide.

6. A method according to claim 5, wherein said oxidizing agent is hydrogen peroxide.

7. A method according to claim 6, wherein said catalyst metal salt is platinum chloride.

8. A method according to claum 7, wherein said reducing agent is formic acid.

* * * * *